(12) United States Patent
Yamamoto et al.

(10) Patent No.: US 7,076,457 B2
(45) Date of Patent: Jul. 11, 2006

(54) INFORMATION PROCESSING METHOD AND SYSTEM ON CONTRIBUTION TRADE MARKET

(75) Inventors: Akio Yamamoto, Kawasaki (JP); Takehiko Toyosawa, Tokyo (JP); Hiroshi Yamagishi, Kawasaki (JP)

(73) Assignees: Fujitsu Limited, Kawasaki (JP); FFC Limited, Tokyo (JP)

( * ) Notice: Subject to any disclaimer, the term of this patent is extended or adjusted under 35 U.S.C. 154(b) by 273 days.

(21) Appl. No.: 10/436,098

(22) Filed: May 13, 2003

(65) Prior Publication Data

US 2003/0191696 A1     Oct. 9, 2003

Related U.S. Application Data

(63) Continuation of application No. PCT/JP01/02085, filed on Mar. 16, 2001.

(30) Foreign Application Priority Data

Nov. 13, 2000  (JP)  ............................. 2000-345070

(51) Int. Cl.
*G06F 17/60* (2006.01)
(52) U.S. Cl. ......................................... 705/27; 705/35
(58) Field of Classification Search .................. 705/31
See application file for complete search history.

(56) References Cited

U.S. PATENT DOCUMENTS 6,222,534 B1    4/2001    Ohishi et al.

FOREIGN PATENT DOCUMENTS

EP          1 067 471 A1      1/2001
JP          2000-155786       6/2000

OTHER PUBLICATIONS

Ebay Press Release, "The Best of Hollywood", Mar. 2000.*

* cited by examiner

*Primary Examiner*—Richard Weisberger
(74) *Attorney, Agent, or Firm*—Staas & Halsey LLP

(57) ABSTRACT

This invention provides a trade system of contribution articles, which enables information gathered by many people to be efficiently used in the mass media such as a newspaper or a magazine. First, the contributor photographs an image of an accident or the like using a contributor terminal 7. Besides, position verification information of the accident locale is acquired from a position verification authentication server 3. Then, the image information of the accident or the like and the position verification information are registered into a contribution market server 13 by the contribution terminal 7. A person in charge at the mass medium operates a mass medium terminal 11 to access to the contribution market server 13, and finds out articles for which purchase priority is to be acquired. For example, when knocking down the purchase priority by the auction, the contribution market server 13 extracts an investigator in the vicinity of the locale of the accident or the like for the corroborative investigation, and transmits them to the mass medium terminal 11. The investigation request is transmitted to an investigator terminal 9 of the investigator. If there is no problem in the corroborative investigation, a purchase procedure is carried out. Incidentally, the contributor can set a condition concerning a selling destination and/or a sum of money, and according to that, a successful bid is determined.

21 Claims, 9 Drawing Sheets

FIG.3

| CONTRIBUTOR NAME | ID/ PASSWORD | PERSONAL INFORMATION | TRADE CONDITION |
|---|---|---|---|
| AKIO YAMAMOTO | CD0001/ 0001 | 09012343210/ 1-18-18 EBISU MINATO-KU/ ... | PRIORITY IS GIVEN TO ABCD COMPANY/ REMITTANCE DESTINATION/ ... |
| ------- | ------- | ------- | ------- |

FIG.4

| COMPANY NAME | ID/ PASSWORD | NAME OF PERSON IN CHARGE | CONTACT ADDRESS | ACCOUNT NAME |
|---|---|---|---|---|
| ABCD | 987/ 5559 | ICHIRO YAMADA | 0355599999/ 2-18-50 EBISU SHIBUYA-KU | XX444 |
| ------- | ------- | ------- | ------- | ------- |

FIG.5

| ARTICLE ID | CONTRIBUTOR ID | ATTRIBUTE | IMAGE FILE NAME | ARTICLE FILE NAME | POSITION VERIFICATION INFORMATION FILE | ANOTHER FILE NAME | TRADE CONDITION |
|---|---|---|---|---|---|---|---|
| 0001 | CD0001 | FIRE | jiken.jpg | jiken.txt | position0922 | jiken.mpg | WITHIN 5 HOURS, ABCD COMPANY/ AT LEAST 50000 YEN |
| ------- | ------- | ------- | ------- | ------- | ------- | ------- | ------- |

FIG.6

| COMPANY NAME | INVESTIGATOR NAME(ID) | MAIL ADDRESS | TEL. NO. | POSITION (LATITUDE, LONGITUDE) |
|---|---|---|---|---|
| ABCD | ABCD0001 | ABCD0001@ABC.COM | 09022345678 | (139° 00' 00, 195° 00' 00) |
| ------- | ------- | ------- | ------- | ------- |

PPA: PURCHASE-PRIORITY-ACQUIRED

US 7,076,457 B2

1

INFORMATION PROCESSING METHOD AND SYSTEM ON CONTRIBUTION TRADE MARKET

CROSS-REFERENCE TO RELATED APPLICATIONS

This application is a continuing application, filed under 35 U.S.C. section 111(a), of International Application PCT/JP01/02085, filed Mar. 16, 2001, it being further noted that foreign priority benefit is based upon Japanese Patent Application 2000-345070, filed Nov. 13, 2000.

TECHNICAL FIELD OF THE INVENTION

The present invention relates to an information processing technique associated with the trade market of a scoop photograph etc. of an accident or the like.

BACKGROUND OF THE INVENTION

In recent years, the performance of a portable terminal, a cellular phone or the like is remarkably improved, and in addition to access to the Internet and transmission and reception of e-mail, even the cellular phone or the like can take a static image or a moving image. Since a dedicated photographing equipment also becomes light and inexpensive, the number of persons carrying it has increased. Besides, in a next-generation mobile communication system such as IMT-2000, high speed data communication also becomes possible. Thus, it is becoming possible to transmit the taken static image or moving image in real time.

Under such circumstances, when encountering an accident or happening, many people can photograph the state and the like. However, at present, there is no market on which the scoop photograph, image and etc. of the accident or happening etc. is freely traded.

SUMMARY OF THE INVENTION

An object of the invention is therefore to provide a trade system of contribution articles, which enables information gathered by many people to be efficiently used in the mass media such as a newspaper or a magazine.

An information processing method on a contribution trade market according to the invention includes the steps of: receiving contribution image information of a contributor and photographing position verification information by a third party and storing them into a contribution information storage device; receiving a bid for a specific contribution from a terminal of a purchase wisher and determining a bid satisfying at least one of a trade condition set by the contributor of the specific contribution and a system successful bid condition; and notifying grant of purchase priority to the purchase wisher who made the bid satisfying at least one of the trade condition set by the contributor of the specific contribution and the system successful bid condition.

By incorporating the photographing position verification information by the third party, the reliability of the contribution can be raised. Besides, since the grant of the purchase priority for the specific contribution is performed by judging whether it satisfies the trade condition set by the contributor of the specific contribution, the preference or the like (a desired mass medium name and/or a sum of money) of the contributor can be reflected. On the other hand, if the contributor does not set the trade condition, the grant of the

2 purchase priority may be made in, for example, a normal auction mode. Further, the purchase priority may be set so as to be granted to plural purchase wishers. Besides, in the case where the contents of an article are such that the freshness of information is required, it is also possible to make such a setting that the trade condition is changed with the lapse of time. A condition concerning the acceptability of use by plural media (combination of a newspaper and a magazine, etc.) may be set.

Not only photographing image information, but also article and/or audio information may be added and registered. Besides, by setting attribute information corresponding to the contribution contents, it is also possible to make it easy for a person in charge at a mass medium to perform a search.

Besides, before the purchase, in the case where a selection input concerning a corroborative investigation for the specific contribution for which the purchase wisher has the purchase priority is received from the terminal of the purchase wisher, a step of extracting an investigator in the vicinity of a contribution locale from an investigator position information storage device on the basis of the photographing position verification information for the specific contribution, and a step of transmitting an investigation request for the specific contribution to the investigator in the vicinity of the contribution locale may be further carried out. By this, it is also possible to make a purchase after receiving the corroboration.

Incidentally, the information processing method as stated above can be implemented by a combination (contribution market system) of a normal computer and a program, and the program is stored in a storage medium or a storage device such as, for example, a floppy disk, a CD-ROM, a magneto-optical disk, a semiconductor memory or a hard disk. Besides, intermediate data in the middle of processing is stored in a storage device such as a main memory of a computer.

BRIEF DESCRIPTION OF THE DRAWINGS

FIG. 3 is a drawing showing an example of information stored in a contributor DB;

FIG. 4 is a drawing showing an example of information stored in a mass media DB;

FIG. 5 is a drawing showing an example of information stored in an article DB;

FIG. 6 is a drawing showing an example of information stored in an investigator position DB;

DETAILED DESCRIPTION OF THE EMBODIMENTS

Figure 1:
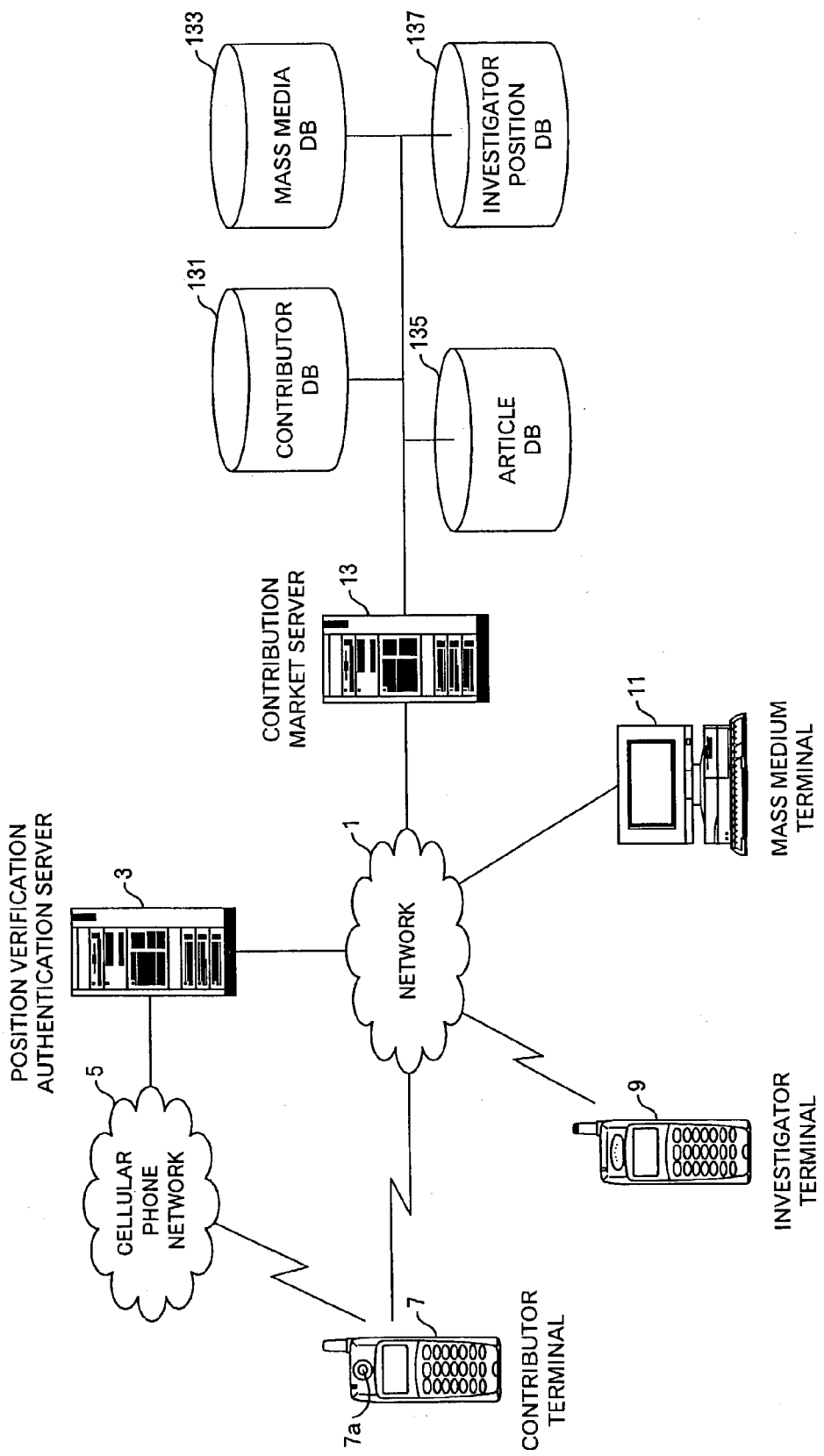
FIG. 1 is a drawing showing the outline of a system according to one embodiment of the present invention.

FIG. 1 shows the outline of a system according to one embodiment of the present invention. A network 1 which is, for example, the Internet is connected with a position verification authentication server 3 for detecting the position of a portable terminal or a cellular phone and issuing positional verification information, a contribution market server 13 having a Web server function and performing a main processing of this embodiment, and a mass medium terminal 11 which is, for example, a personal computer installed with a Web browser and is operated by a person working in a mass medium. Besides, a contributor terminal 7, which is, for example, a cellular phone having a built-in digital camera 7a and is operated by a contributor, and an investigator terminal 9, which is, for example, a cellular phone and is operated by a reporter (investigator) of a mass medium can also be connected to the network 1. Incidentally, the contributor terminal 7 may acquire position verification information by accessing the position verification authentication server 3 through a cellular phone network 5 not the network 1. Besides, the contributor terminal 7 and the investigator terminal 9 can exchange e-mails.

The contributor terminal 7 may be a communication equipment, which does not have the built-in digital camera 7a and can receive information of static images or moving images from a digital camera or a digital video camera. Besides, a cellular phone may be connected to a portable terminal having no communication function.

The contribution market server 13 manages a contributor database (DB) 131 in which a contributor capable of registering an article or the like on the contribution market is previously registered, a mass media DB 133 in which mass media capable of using the contribution market are previously registered, an article DB 135 in which information of contributed articles or the like is stored, and an investigator position DB 137 in which position information of investigators of respective mass media, who were previously registered by the mass media, is stored at predetermined time intervals. For example, the position of the investigator terminal 9 detected by the position verification authentication server 3 is transmitted to the contribution market server 13 at predetermined time intervals, and the transmitted position information is stored in the investigator position DB 137.

The position verification authentication server 3 not only issues the position verification information, but also performs, in the case where an authentication request including position verification information is received, an authentication processing for confirming whether the position verification information is true. Incidentally, in FIG. 1, although the number of the respective terminals and servers is one for each, the number of these equipments is arbitrary.

Figure 2:
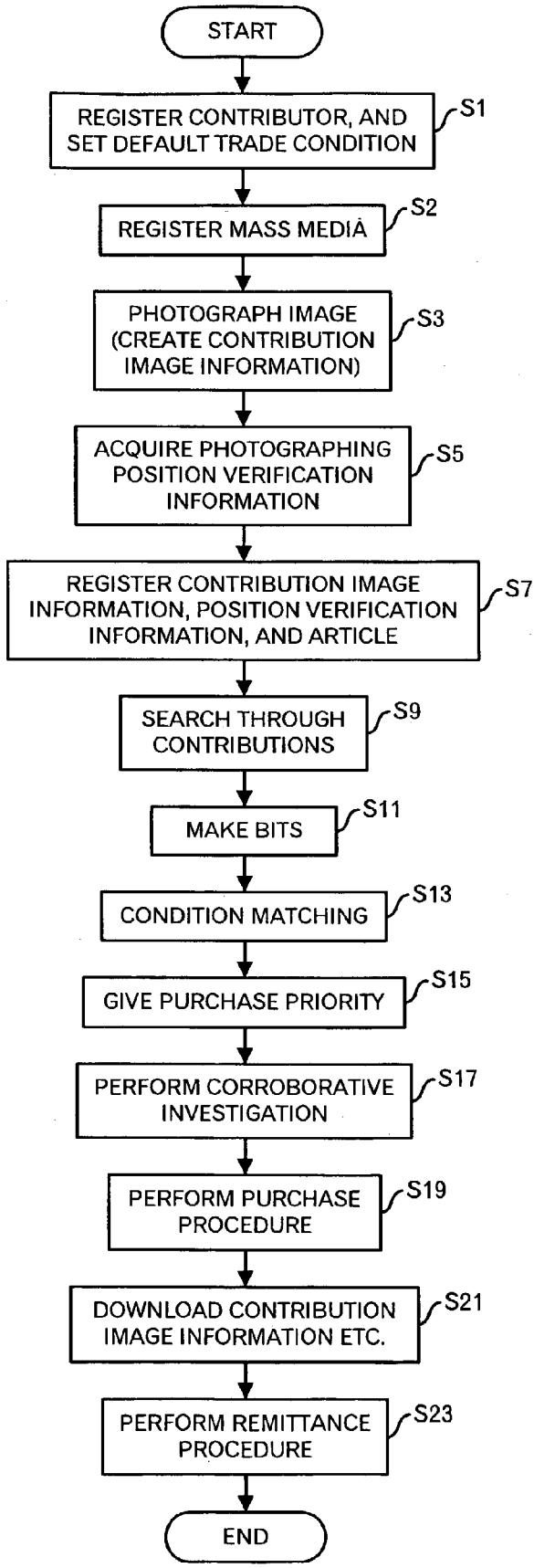
FIG. 2 is a flow diagram of the whole business.

A business flow of this embodiment will be described with reference to FIG. 2. First, a contributor registers oneself in the contribution market server 13 (step S1). Besides, a default trade condition is also set. The registered contents are stored in the contributor DB 131. An example of data stored in the contributor DB 131 is shown in FIG. 3. As shown in FIG. 3, the contributor DB 131 includes a contributor name, a contributor ID and password, personal information such as a telephone number (for example, a cellular phone number) and an address, and information of the default trade condition (for example, priority is given to ABCD Company, information of a remittance destination, lowest price information, etc.). Incidentally, a condition added to the default trade condition, or a condition substituting for the default trade condition can also be registered for each contribution. Besides, in the case where an evaluation system of a contributor (for example, a system in which a mass medium having purchased a contribution article or the like registers a point in an evaluation item as to, for example, whether a fact is reported, so that a contributor having a low point because of an unfair act is excluded) is introduced in this system, a point value in this evaluation system may be stored in the table of FIG. 3. Although not shown in FIG. 3, for example, information relating to the past sales may be kept.

Next, a mass medium registers oneself in the contribution market server 13 (step S2). The registered contents are stored in the mass media DB 133. An example of data stored in the mass media DB 133 is shown in FIG. 4. As shown in FIG. 4, information of a company name, an ID and a password, a name of a person in charge, a contact address, and an account name (bank account name, etc.) for settlement are stored. Incidentally, a list of articles (contributions) for which purchase priorities are acquired and purchased articles (contributions) may be included.

Then, when encountering an accident or happening, the contributor uses the contributor terminal 7 to take a static image or a moving image (step S3). That is, he or she creates contribution image information. Then, he or she transmits a position verification issuance request including present position information from the contributor terminal 7 through the cellular phone network 5 or the network 1 to the position verification authentication server 3, and acquires photographing position verification information from the position verification authentication server 3 (step S5). Thereafter, he or she registers the contribution image information, the position verification information, an article of words, a comment by a voice, and the like through the network 1 into the contribution market server 13 (step S7). Incidentally, at the time of registration, an attribute such as, for example, an accident, a natural disaster, or a gossip may be registered for a search from a mass medium. Besides, in the case where a trade condition different from the default trade condition is registered, it is performed at this stage.

In the contribution market server 13, registration is made into the article DB 135. An example of the article DB135 is shown in FIG. 5. As shown in FIG. 5, the article DB 135 stores an article ID (for example, 0001), a contributor ID (for example, CD0001), an attribute (for example, a fire), an image file name (for example, jiken.jpg), an article file name (for example, jiken.txt), a position verification information file (for example, position0922), another file name (for example, jiken.mpg), and a trade condition (for example, "within five hours, ABCD Company, at least 50000 yen"). The files themselves are separately stored in the article DB 135. Although not shown in FIG. 5, information concerning a bid, information concerning a person having acquired purchase priority and a person having purchased may be stored.

A person in charge at a mass medium uses the mass medium terminal 11 to access the contribution market server 13 and to search through the contribution articles and the like (step S9). The person in charge at the mass medium selects suitable information by, for example, performing a keyword search or a newly received contribution list. Then, the person in charge at the mass medium makes a bid including a purchase-desired sum of money for a specific contribution (step S11).

The contribution market server 13 judges whether the bid satisfies the trade condition set by the contributor and the successful bid condition of the system (step S13). For example, if the trade condition set by the contributor includes designation of a name of a mass medium, it is judged whether the mass medium having made the bid conforms to the condition. Besides, if there is a condition of a sum of money, it is judged whether the bid price meets the condition. Incidentally, if the contributor does not set a specific condition, in accordance with the successful bid condition of the system, for example, a mass medium having made a bid of a large sum of money is simply selected as a successful bidder. In addition, in the case of information which is required to have freshness of information, it is also possible to make such a setting that the sum of money included in the trade condition set by the contributor is lowered with the lapse of time, and at the step S13, a successful bid is judged on the basis of the lowered sum of money. Further, a condition setting may be made such that the price is changed according to the medium of a mass medium, plural mass media can use the contribution, or an exclusive use is allowed, and in that case, it is judged whether the bid satisfies the respective conditions.

Then, the purchase priority is given to a mass medium having made the bid conforming to the trade condition set by the contributor and the successful bid condition of the system (step S15). Incidentally, according to a simple way, the purchase priority is given to a mass medium having put the highest price. Although the mass medium can perform a purchase procedure at this point of time, it is also possible to perform the purchase procedure after a corroborative investigation is performed. Here, the corroborative investigation is performed (step S17). For example, when a specific contribution for which the corroborative investigation is to be performed is selected from the purchase-priority-acquired contribution list, investigators in the vicinity of the locale of the contribution are acquired from the investigator position DB 137, and a candidate investigator list is exhibited to the person in charge at the mass medium. When the person in charge at the mass medium selects an investigator to give an instruction to the contribution market server 13, an investigation request is transmitted to the investigator terminal 9 by mail or the like. The investigation request includes, for example, the outline of the article. For example, an investigation report is directly delivered to the person in charge at the mass medium.

Incidentally, an example of the investigator position DB 137 is shown in FIG. 6. In this embodiment, a company name, an investigator name (ID), a mail address, a telephone number, and position information (latitude, longitude) updated at predetermined time intervals are included.

In the case where the person in charge at the mass medium determines to purchase the contribution as a result of the corroborative investigation, a purchase procedure is performed (step S19). Incidentally, a time from the acquisition of purchase priority to the purchase procedure may be limited to a definite time, and before the purchase procedure is started, the contribution market server 13 may judge whether the purchase condition is fulfilled. Besides, in the purchase procedure, whether charging is possible may be checked by using the account name as shown in FIG. 4. If charging is possible, a charging processing is performed.

When the charging processing is ended, it becomes possible to download the contribution image information and the like from the article DB 135 (step S21). The mass medium uses the downloaded contribution image information and the like to perform publishing, reporting or the like. Thereafter, a contribution market operator performs a remittance processing to the contributor (step S23). Incidentally, a processing may be performed such that a remittance is made to a remittance destination each time, or an account is provided for each contributor to form a pool, and a remittance is made to a specified remittance destination in accordance with the instruction of the contributor.

Hereinafter, the details of a processing of the system shown in FIG. 1 will be described. First, a processing performed until the contributor terminal 7 registers the image information or the like into the contribution market server 13 will be described with reference to FIG. 7. When encountering an accident, happening or the like, the contributor operates the contributor terminal 7 or the like to take an image for contribution (step S31). Next, the contributor terminal 7 acquires the position information of the contributor terminal 7 by a predetermined method (step S33). For example, the predetermined method may be a method in which the position of a base station and the intensity of a radio wave are used to calculate the position by itself, or may be a method in which in the case where a GPS (Global Positioning System) device is provided in or connected to the contributor terminal 7, the position information measured by the GPS device is acquired.

Then, the contributor operates the contributor terminal 7 to transmit a position verification request including the acquired position information to the position verification authentication server 3 (step S35). Incidentally, concerning the position verification request, it may be transmitted through the cellular phone network 5, or it may be transmitted through the network 1. In the case where the network 1 is the Internet, a problem of falsification or the like can occur, however, if a transmission is made through the cellular phone network 5, a problem of falsification does not occur. When receiving the position verification request including the position information (step S37), the position verification authentication server 3 acquires the terminal position of the contributor terminal 7 having transmitted the position verification request (step S39). The acquisition processing of the terminal position is a position detection processing of a cellular phone or a PHS (Personal Handy phone System) telephone and is conventionally performed, and therefore, the details will not be described here.

Next, the position verification authentication server 3 performs a comparison processing of the received position information and the acquired terminal position (step S41). Since an error is included in the position information and the terminal position, it is judged whether the position information is contained within a predetermined range of the terminal position. In the case where the position information is not contained within the predetermined range of the terminal position, position verification cannot be issued, and therefore, the position verification authentication server 3 transmits an issuance refusal to the contributor terminal 7. The contributor terminal 7 receives the issuance refusal of the position verification from the position verification authentication server 3 and displays it (step S43). In case the position information is contained within the predetermined range of the terminal position, the position verification information is generated and is transmitted to the contributor terminal 7 (step S45).

When receiving the position verification information (step S47), the contributor terminal 7 notifies the contributor that the position verification information is received. The contributor transmits the contribution image information, the received position verification information, and a separately prepared article (text) and/or comment voice information to the contribution market server 13 (step S49). The information as set forth above is transmitted by, for example, e-mail. Besides, a following mode may be adoptable. Namely, access to an upload screen of the contribution market server 13 is made, and a file to be uploaded is specified from the screen and is transmitted. Here, the latter case will be described. A following mode may be adoptable. That is, plural files are specified at once, and all the files are transmitted at once. Or a following mode may be adoptable. That is, plural files are divided into plural groups and are transmitted separately. The contribution market server 13 receives the image information, the position verification information and the information such as an article, and registers them into the article DB 135 (step S51). Next, article attribute input screen information (for example, an HTML (Hyper Text Markup Language) file and an image file when an image is included, etc.) is transmitted to the contributor terminal 7 (step S53).

The contributor terminal 7 receives the article attribute information input screen information from the contribution market server 13 and displays it (step S55). The contributor operates the contributor terminal 7 to input the attribute information (for example, an accident, a fire, a happening, others) of the article, and causes it to transmit the article attribute information to the contribution market server 13 (step S57). When receiving the article attribute information from the contributor terminal 7, the contribution market server 13 registers it into the article DB 135, and additionally registers it in the article list as well (step S59). By this, it becomes possible to search by the mass medium terminal 11. Incidentally, a trade condition peculiar to the contribution may be registered, together with the attribute.

Figure 8:
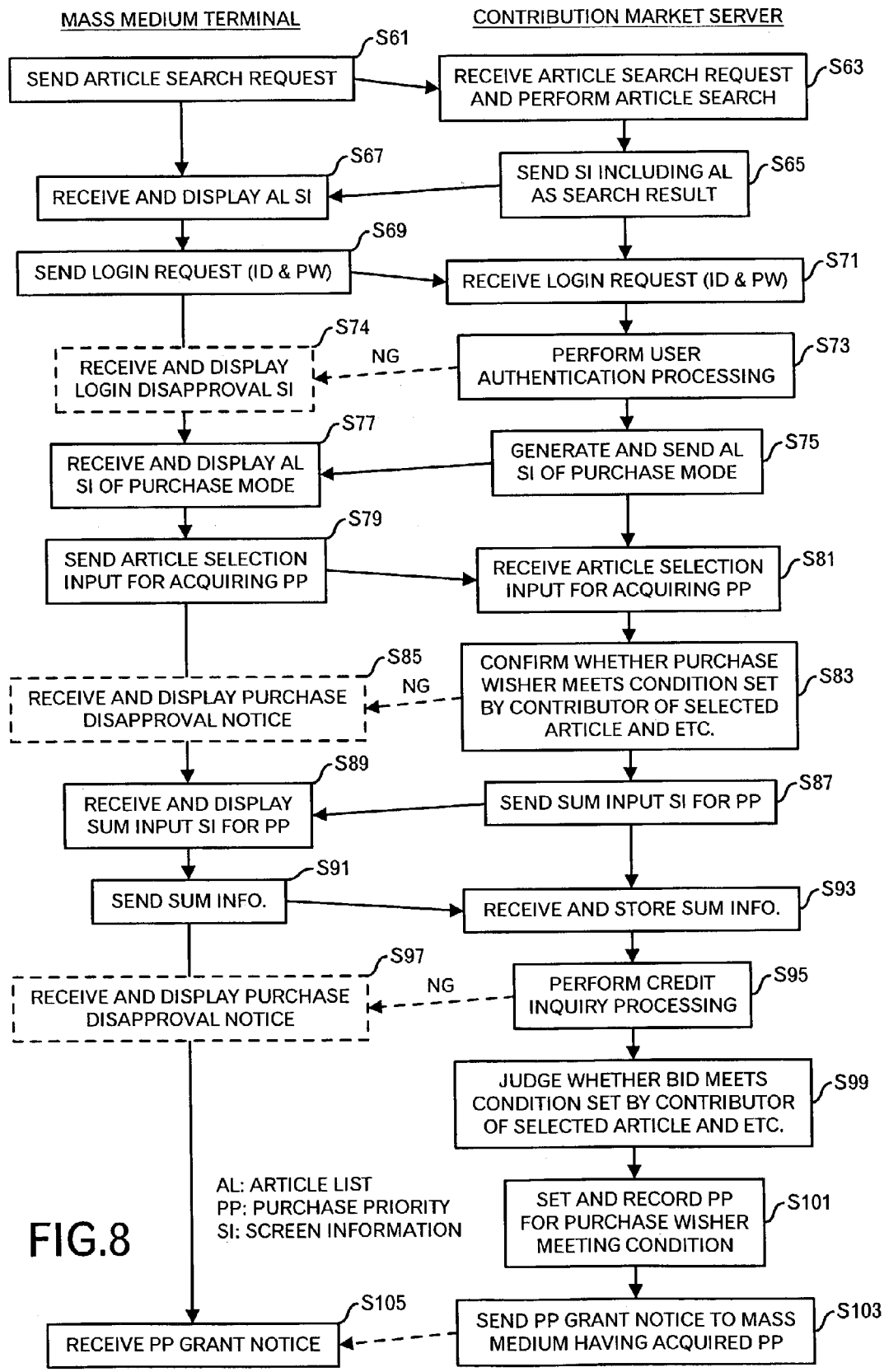
FIG. 8 is a drawing showing a processing flow for acquiring purchase priority.

Next, a process performed until the mass medium terminal 11 acquires purchase priority from the contribution market server 13 will be described with reference to FIG. 8. The person in charge at the mass medium operates the mass medium terminal 11 to access the contribution market server 13, and transmits an article (contribution) search request including a specific search keyword on a search screen to the contribution market server 13 (step S61). Incidentally, the specific search keyword may not be included, and for example, a search for newly registered articles is also acceptable. The contribution market server 13 receives the article search request from the mass medium terminal 11 and performs an article search as requested (step S63).

Then, the contribution market server 13 transmits screen information including an article (contribution) list as a search result to the mass medium terminal 11 as a search requester (step S65). It may be a list of newly registered articles. The mass medium terminal 11 receives the article list screen information from the contribution market server 13, and displays it on a display device (step S67). Here, the person in charge at the mass medium watches the article list screen to consider whether there is an article to be purchased. If there is an article (contribution) to be purchased, the person in charge inputs a login request including an ID and a password, and causes the mass medium terminal 11 to transmit the login request to the contribution market server 13 (step S69). The contribution market server 13 receives the login request from the mass medium terminal 11 (step S71), and performs a user authentication processing (step S73). The user authentication processing is performed using an ID and a password of the person in charge registered in the mass media DB 133 and the received ID and password.

When failing in the user authentication processing, the contribution market server 13 transmits screen information expressing login disapproval to the mass medium terminal 11, and the mass medium terminal 11 receives the screen information and displays it on the display device (step S74). On the other hand, when succeeding, the contribution market server 13 generates article list screen information of a purchase mode and transmits it to the mass medium terminal 11 (step S75). On the article list screen of the purchase mode, a button or the like for selecting an article to be purchased is provided for each of the articles, together with a list of articles (contributions). The mass medium terminal 11 receives the article list screen information of the purchase mode and displays it on the display device (step S77). The person in charge at the mass medium presses the button of the article to be purchased to perform an article selection input for acquiring purchase priority, and the mass medium terminal 11 transmits the article selection input for acquiring the purchase priority to the contribution market server 13 (step S79). When receiving the article selection input (step S81), the contribution market server 13 confirms whether the mass medium as a purchase wisher meets the condition set by the contributor of the selected article (contribution) and the like (step S83). For example, in the case where the contributor specifies an ABCD Company as a preferential business connection (see FIG. 3), if the mass medium as the purchase wisher is not the ABCD Company, it cannot be said that the condition is fulfilled. In addition, in the case where a purchaser's requirement is set in the system side setting condition of the contribution market server 13, it is also judged whether the system side setting condition is fulfilled. For example, it is judged whether a purchase wisher is a person, who has a dispute with a contributor and for whom suspension of trades is set.

It is also possible to change the condition concerning a purchase wisher with the lapse of time. That is, it is also possible to make such a setting that purchase is accepted only from the ABCD Company for five hours after the contribution, and thereafter, the purchaser's condition is deleted.

In case it is judged that the purchase wisher does not meet the condition set by the contributor of the selected article, the contribution market server 13 transmits purchase disapproval notice to the mass medium terminal 11, and the mass medium terminal 11 receives the purchase disapproval notice and displays it on the display device (step S85). On the other hand, in case it is judged that the condition is fulfilled, the contribution market server 13 transmits sum input screen information for purchase priority to the mass medium terminal 11 (step S87). The mass medium terminal 11 receives the sum input screen information for the purchase priority and displays it on the display device (step S89). Then, the person in charge at the mass medium inputs a sum of money, and the mass medium terminal 11 transmits the inputted sum information to the contribution market server 13 (step S91). The contribution market server 13 receives the sum information, and stores it in a storage device for recording bids, correspondingly to the selected article (step S93). Then, a credit inquiry processing is performed with respect to the mass medium as the purchase wisher (step S95). That is, by using, for example, the account information of the mass media DB 133, it is confirmed whether payment of the input sum of money can be ensured. In case it is judged in the credit inquiry processing that settlement can not be accomplished, the contribution market server 13 transmits purchase disapproval notice to the mass medium terminal 11, and the mass medium terminal 11 receives the purchase disapproval notice and displays it on the display device (step S97).

On the other hand, in the case where the credit inquiry processing is successful, for example, after the end of a bidding period, the following processing is performed. However, in case the setting of the contributor is such that all mass media can purchase (use) if the bid sum is not lower than a predetermined sum of money, the following processing may be performed each time the bid is received. The processing to be performed (step S99) is a processing to judge whether the bid meets the condition set by the contributor of the selected article (contribution) and the like. For example, such a condition (contributor setting condition) that a bid sum of money exceeds the lowest successful bid sum of money, and/or such a condition (system setting condition) that it is higher than the previous highest bid sum of money is confirmed.

The setting of the contributor can also be made so as to vary with the lapse of time. For example, there is also a case where if a bid is made within the first five hours, the lowest successful bid sum of A is used, and if a bid is not made within the five hours, the lowest successful bid sum lower than A is used.

Incidentally, the condition set by the contributor has further variations. For example, it is also possible to make such a setting that if used by only a newspaper, the sum of A is the lowest successful bid price, and if used by a newspaper+a weekly magazine, the sum of (A+B) is the lowest successful bid sum. On the other hand, with respect to the bid as well, plural kinds of bids corresponding to this, such as a bid for only a newspaper or a bid for a newspaper+a weekly magazine, are enabled.

Besides, in the case where plural mass media are allowed to use, it is also possible to make such a setting that for example, up to three companies, the lowest successful bid sum per company is A, and up to five companies, the lowest successful bid sum per company is B lower than A.

After the step S99, purchase priority is set for the purchase wisher having made the bid meeting the condition, and is recorded (step S101). For example, the recording is performed by registering the ID of the mass medium into the article DB 135, correspondingly to the article. Alternatively, the article ID may be stored in the storage area of the mass medium having acquired the purchase priority in the mass media DB 133. Then, purchase priority grant notice is transmitted to the mass medium (the person in charge) having acquired the purchase priority (step S103). The purchase priority grant notice is sent by, for example, e-mail. The mass medium terminal 11 receives the purchase priority grant notice of the e-mail or the like (step S105).

Figure 9:
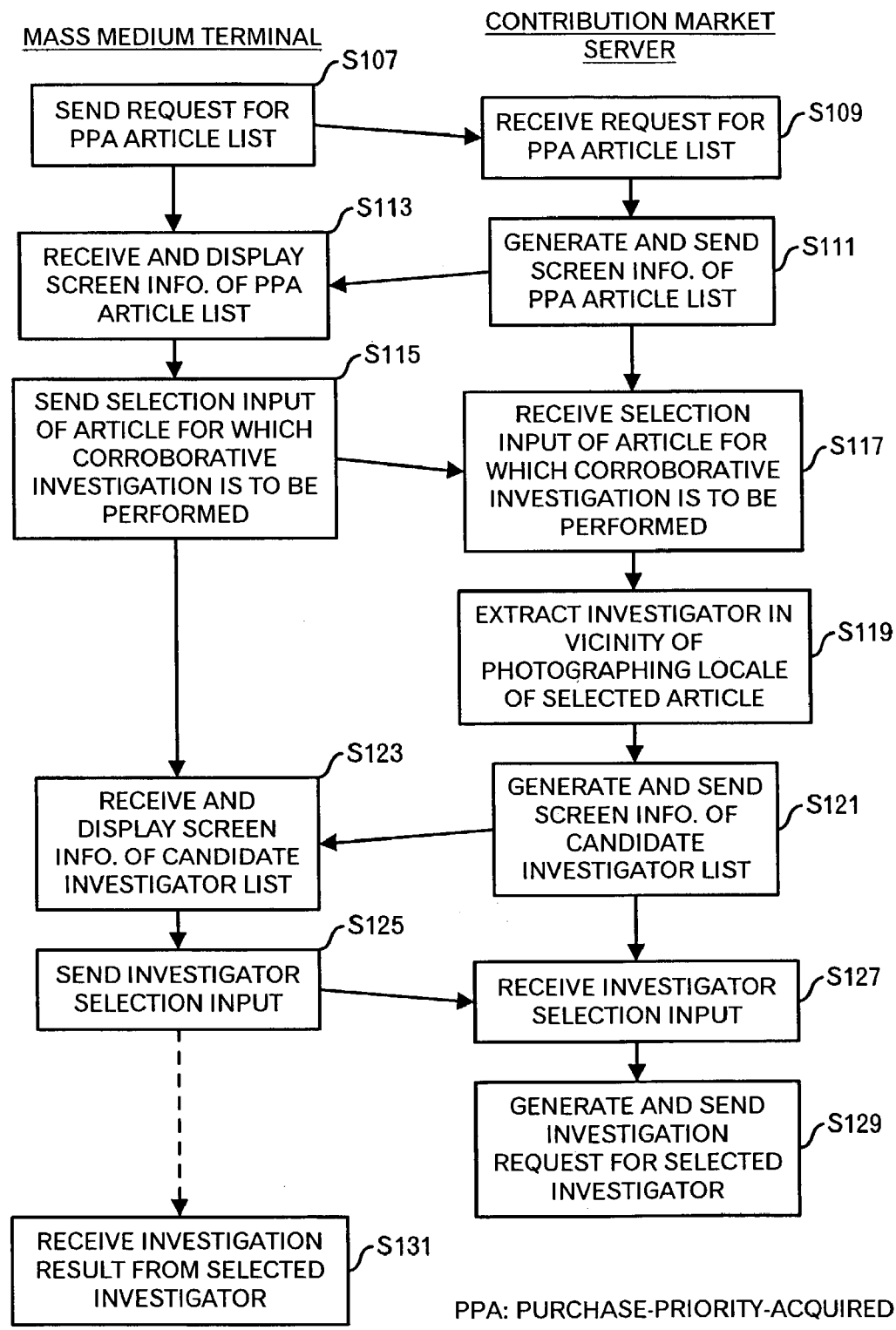
FIG. 9 is a drawing showing a processing flow of a corroborative investigation.

In FIG. 9, a processing associated with a corroborative investigation will be described. After logging in to the contribution market server 13, the person in charge at the mass medium causes the mass medium terminal 11 to transmit a request for a purchase-priority-acquired article list to the contribution market server 13 (step S107). When receiving the request for the purchase-priority-acquired article list (step S109), the contribution market server 13 generates screen information of the purchase-priority-acquired article list by using, for example, the article DB 135 and transmits it to the mass medium terminal 11 (step S111). On the screen of the purchase-priority-acquired article list, for example, a purchase button and a corroborative investigation button are provided for each purchase-priority-acquired article.

The mass medium terminal 11 receives the screen information of the purchase-priority-acquired article list from the contribution market server 13 and displays it on the display device (step S113). The person in charge at the mass medium watches this screen, selects an article (contribution) for which a corroborative investigation is to be performed, and causes the mass medium terminal 11 to transmit a selection input of the article, for which an corroborative investigation is to be performed, to the contribution market server 13 (step S115). The contribution market server 13 receives the article selection input (step S117), accesses the article DB 135 to acquire the position verification information of the selected article, and specifies the photographing locale. Then, it accesses the investigator position DB 137, and extracts investigators in the vicinity of the photographing locale (step S119). The range of "vicinity" is previously defined, and an investigator included in the range from the photographing locale as the center is extracted. Here, although investigators are registered by the respective mass media, a contribution market operator may dispose investigators.

Then, the contribution market server 13 generates screen information of a candidate investigator list and transmits it to the mass medium terminal 11 (step S121). The mass medium terminal 11 receives the screen information of the candidate investigator list and displays it on the display device (step S123). The person in charge at the mass medium watches the screen to select an investigator, and causes the mass medium terminal 11 to transmit an investigator selection input to the contribution market server 13 (step S125).

The contribution market server 13 receives the investigator selection input (step S127), and extracts, for the selected investigator, for example, the photographing locale position information (longitude and latitude, address converted from the longitude and latitude) of the selected article, the outline of the article and the like from the article DB 135 to generate an investigation request, and transmits it to the investigator terminal 9 via e-mail (e-mail address is acquired from the investigator position DB 137) (step S129). Alternatively, a telephone call may be made to the investigator terminal 9.

In response to this, the investigator conducts a corroborative investigation at the photographing locale. The investigation result is notified to the person in charge at the mass medium via e-mail from the investigator terminal 9 or by telephone (step S131). By this investigation result, the person in charge at the mass medium judges whether the price may be paid for the article (contribution) for which the purchase priority is acquired. If a judgment is made that it is valueless, it may be discarded. For example, in the case where the purchase procedure is not performed within a definite period from the purchase priority grant notification, the purchase priority may be transferred to a mass medium offering the next most favorable condition.

Figure 10:
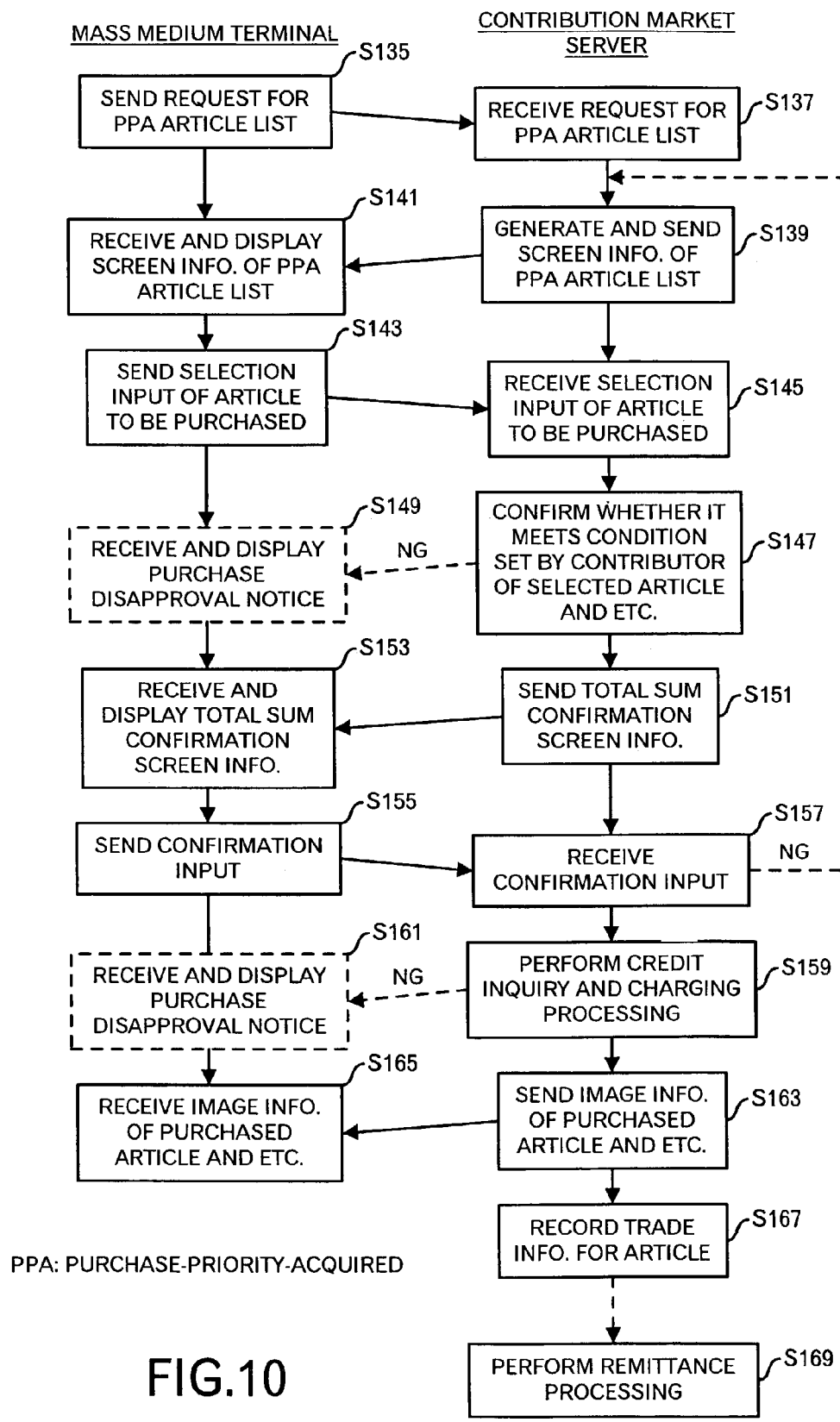
FIG. 10 is a drawing showing an article (contribution) purchase processing flow.

Next, a purchase processing will be described by use of FIG. 10. After logging into the contribution market server 13, the person in charge at the mass medium causes the mass medium terminal 11 to transmit the request for the purchase-priority-acquired article list to the contribution market server 13 (step S135). When receiving the request for the purchase-priority-acquired article list (step S137), the contribution market server 13 generates the screen information of the purchase-priority-acquired article list by using, for example, the article DB 135 and transmits it to the mass medium terminal 11 (step S139)

The mass medium terminal 11 receives the screen information of the purchase-priority-acquired article list from the contribution market server 13 and displays it on the display device (step S141). The person in charge at the mass medium watches this screen to select an article (contribution) to be purchased, and causes the mass medium terminal 11 to transmit a selection input of an article to be purchased to the contribution market server 13 (step S143). The contribution market server 13 receives the selection input of the article to be purchased (step S145), and judges whether it meets the condition set by the contributor of the selected article and the like (step S147). For example, it confirms such a condition that the purchase procedure is performed within a predetermined period after the purchase priority grant notification. There is a case where a judgment is made as to whether the system setting condition is also fulfilled. In case the conditions are not fulfilled, the contribution market server 13 transmits purchase disapproval notice to the mass medium terminal 11, and the mass medium terminal 11 receives the purchase disapproval notice and displays it on the display device (step S149).

On the other hand, in case the conditions are fulfilled, the contribution market server generates total sum confirmation screen information and transmits it to the mass medium terminal 11 (step S151) The mass medium terminal 11 receives the total sum confirmation screen information and displays it on the display device (step S153). Then, the person in charge at the mass medium confirms the sum of money and makes a confirmation input. The mass medium terminal 11 transmits the confirmation input to the contribution market server 13 (step S155). In case the confirmation input indicates purchase cancel, the procedure returns to, for example, the step S139. In case the confirmation input indicates purchase confirmation, access to the mass media DB 133 is made, and a credit inquiry is made by using account information, and if there is no problem, a charging processing is performed (step S159). In case a result that the settlement is unable is obtained in the credit inquiry, the contribution market server 13 transmits purchase disapproval notice to the mass medium terminal 11. The mass medium terminal 11 receives the purchase disapproval notice and displays it on the display device (step S161).

When the credit inquiry is made and the charging processing is performed, the contribution market server 13 extracts the image information and the like of the purchased article from the article DB 135, and transmits it to the mass medium terminal 11 (step S163). The image information, the position verification information, and other article text information are transmitted. The mass medium terminal 11 receives the image information of the purchased article (step S165) and it is used in a newspaper, a magazine, or a report.

Incidentally, trade (usage permission) information concerning the article is separately recorded in a storage device (step S167). For example, the sum of money and the information of the purchaser may be recorded in a storage area of the article in the article DB 135, or a trade information DB may be separately provided. Incidentally, there is a case where a setting is made such that an article search is not performed for the article (contribution), for which the trade (usage permission) is completed.

With respect to the money for the article collected from the mass medium, it may be temporarily pooled for each contributor and may be remitted to a remittance destination on the instruction of the contributor, or may be remitted to a previously set remittance destination each time a payment is made (step S169).

As described above, according to this embodiment, it is possible to realize the contribution market on which information gathered by many people can be efficiently used by mass media such as a newspaper and a magazine.

Although the one embodiment of the present invention has been described, various modifications can be made. Especially, although the credit inquiry is performed at the time of a bid or the time of a purchase proposal, it is also possible to adopt such a configuration that an examination at the time of registration to the contribution market is made strict, and the credit inquiry processing is not performed. Besides, although the above embodiment has a configuration such that after the purchase priority is set, the corroborative investigation is made and the purchase procedure is separately performed, it is also possible to adopt such a procedure that the grant processing of the purchase priority is not performed, and the purchase procedure is performed after the corroborative investigation is made.

Besides, the above embodiment has a configuration such that an investigator in the vicinity of a contribution locale is selected, however, one person may be automatically specified and an investigation request may be automatically transmitted.

In the above, the example has been described in which in the case where bid object article, corroborative investigation object article and purchase object article are selected, one is selected, however, plural articles may be selected at the same time.

Although the description has been given of the example of adopting the scheme that the investigation result notice from the investigator of the corroborative investigation to the mass medium is directly performed, it is also possible to adopt such a scheme that it is registered in the contribution market server 13, and other mass media can also use it.

Figure 7:
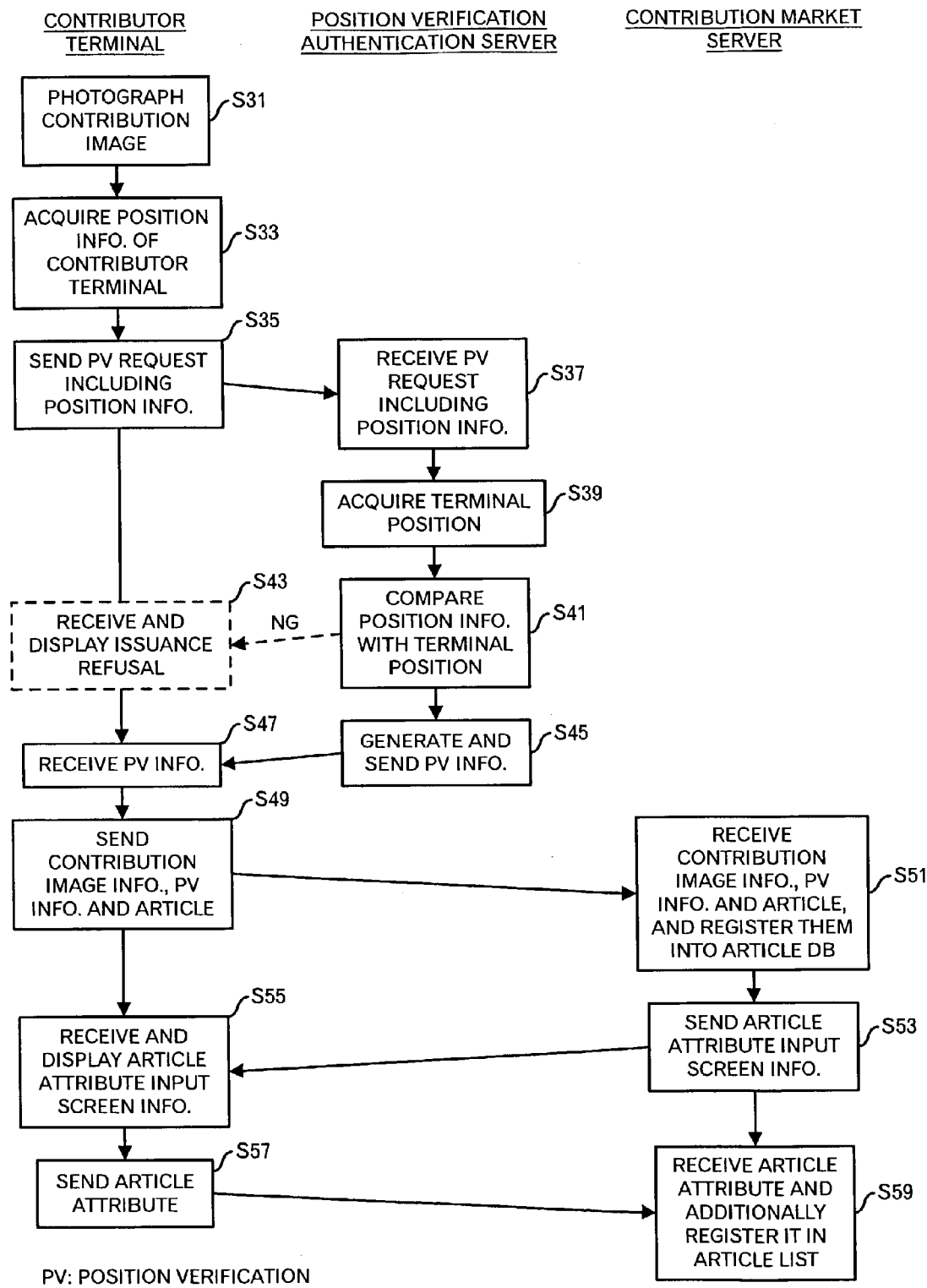
FIG. 7 is a drawing showing a registration processing flow of information associated with a contribution.
Figure 11:
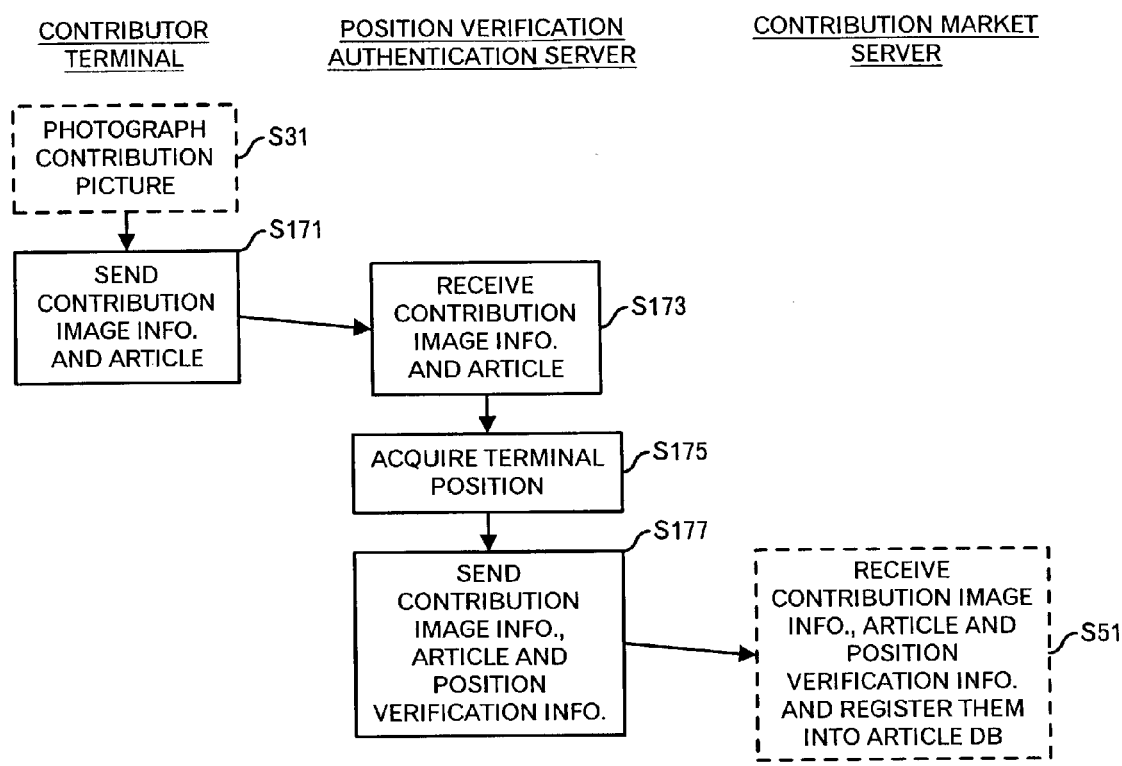
FIG. 11 is a drawing showing a modified example of part of the processing of FIG. 7.

Besides, with respect to the acquisition processing of the terminal position, apart from the step S33 to the step S49 of FIG. 7, a method shown in FIG. 11 can also be adopted. Steps from step S171 to step S177 of FIG. 11 indicate another embodiment of the steps from the step S33 to the step S49 of FIG. 7.

The contributor operates the contributor terminal 7 or the like to take an image for contribution (step S31 of FIG. 7), and then, transmits a separately prepared article (text) and/or comment audio information, together with the image for contribution, to the position verification authentication server 3 (FIG. 11: step S171).

The position verification authentication server 3 receives the image for the contribution and the article transmitted from the contributor terminal 7 (step S173), and acquires the terminal position of the contributor terminal 7 having transmitted the image for the contribution and the article (step S175) Then, the acquired position information is added as the position verification to the image for the contribution and the article transmitted from the contributor terminal 7, and is transmitted to the contribution market server 13 (step S177).

The contribution market server 13 receives the data for the contribution transmitted from the contributor terminal 7 via the position verification authentication server 3 similarly to the data explained in the step S49 of FIG. 7, and continues the processing explained in the step S51 (FIG. 7).

According to the contribution method shown in FIG. 11, the contributor merely transmits the image for the contribution and the article, and makes no mention of information concerning the position, and therefore, it is possible to prevent malicious falsification of the position information by the contributor.

As described above, the provision of a trade system of contribution articles in which information gathered by many people can be efficiently used by mass media such as a newspaper or a magazine has been enabled.

What is claimed is:

1. A computer-implemented scoop information trading method executed by a trading server, comprising:
receiving scoop information obtained and submitted by a poster independent from a buyer, and position information, which is verified by a third party independent from said poster and said buyer, and which represents where said scoop information was obtained, and storing said scoop information and said position information as an object traded on a scoop information trade market, into a submitted information storage device;
receiving a purchase request for specific scoop information stored in said submitted information storage device from a terminal of a buyer, and determining a purchase request satisfying a predetermined trade acceptance condition for said specific scoop information, wherein said predetermined trade acceptance condition is stored in a trade acceptance condition storage device and is used to determine a buyer to be granted a purchase priority of said specific scoop information;

notifying grant of a purchase priority of said specific scoop information to said terminal of a buyer who made a purchase request satisfying said predetermined trade acceptance condition;

extracting an investigator from an investigator position information storage device, who is in the vicinity of the scoop information locale based on said position information for said specific scoop information, which is stored in said submitted information storage device; and transmitting an investigation request for said specific scoop information to a terminal of the extracted investigator.

2. The computer-implemented scoop information trading method as set forth in claim 1, further comprising receiving at least one of article information for said scoop information of said poster or attribute information concerning said scoop information, and storing the received information into said submitted information storage device in association with said scoop information.

3. The computer-implemented scoop information trading method as set forth in claim 1, wherein said predetermined trade acceptance condition includes a condition concerning said buyer.

4. The computer-implemented scoop information trading method as set forth in claim 1, wherein said predetermined trade acceptance condition varies with a lapse of time.

5. The computer-implemented scoop information trading method as set forth in claim 1, wherein said predetermined trade acceptance condition includes a condition whether said scoop information can be used on a plurality of media or not.

6. The computer-implemented scoop information trading method as set forth in claim 1, wherein said predetermined trade acceptance condition includes a condition whether said scoop information can be used by a plurality of buyers or not.

7. The computer-implemented scoop information trading method as set forth in claim 1, further comprising:

carrying out a purchase processing upon receiving a purchase proposal for a specific scoop information from a terminal of said buyer who has said purchase priority for said specific scoop information; and after said purchase processing is carried out, reading out at least said specific scoop information from said submitted information storage device, and transmitting the read information to said terminal of said buyer.

8. A computer readable storage medium which stores a program for trading scoop information, said program causing a computer to execute:

receiving scoop information obtained and submitted by a poster independent from a buyer, and position information, which is verified by a third party independent from said poster and said buyer, and storing said scoop information and said position information as an object traded on a scoop information trade market, into a submitted information storage device;

receiving a purchase request for specific scoop information stored in said submitted information storage device from a terminal of a buyer, and determining a purchase request satisfying a predetermined trade acceptance condition for said specific scoop information, wherein said predetermined trade acceptance condition is stored in a trade acceptance condition storage device and is used to determine a buyer to be granted a purchase priority of said specific scoop information;

notifying grant of a purchase priority of said specific scoop information to said terminal of a buyer who made a purchase request satisfying said predetermined trade acceptance condition;

extracting an investigator from an investigator position information storage device, who is in the vicinity of the scoop information locale based on said position information for said specific scoop information, which is stored in said submitted information storage device; and transmitting an investigation request for said specific scoop information to a terminal of the extracted investigator.

9. The computer-readable storage medium as set forth in claim 8, said program causing said computer to further execute receiving at least one of article information for said scoop information of said poster or attribute information concerning said scoop information, and storing the received information into said submitted information storage device in association with said scoop information.

10. The computer readable storage medium as set forth in claim 8, wherein said predetermined trade acceptance condition includes a condition concerning said buyer.

11. The computer readable storage medium as set forth in claim 8, wherein said predetermined trade acceptance condition varies with a lapse of time.

12. The computer readable storage medium as set forth in claim 8, wherein said predetermined trade acceptance condition includes a condition whether said scoop information can be used on a plurality of media or not.

13. The computer readable storage medium as set forth in claim 8, wherein said predetermined trade acceptance condition includes a condition whether said scoop information can be used by a plurality of buyers or not.

14. The computer readable storage medium as set forth in claim 8, said program causing said computer to further execute:

carrying out a purchase processing upon receiving a purchase proposal for a specific scoop information from a terminal of said buyer who has said purchase priority for said specific scoop information; and after said purchase processing is carried out, reading out at least said specific scoop information from said submitted information storage device, and transmitting the read information to said terminal of said buyer.

15. A scoop information trading system, comprising:

a processor programmed to receive scoop information obtained and submitted by a poster independent from a buyer, and position information, which is verified by a third party independent from said poster and said buyer, and which represents where said scoop information was obtained, and store said scoop information and said position information as an object traded on a scoop information trade market, into a submitted information storage device;

a processor programmed to receive a purchase request for a specific scoop information stored in said submitted information device from a terminal of a buyer, and determine a purchase request satisfying a predetermined trade acceptance condition for said specific scoop information, wherein said predetermined trade acceptance condition is stored in a trade acceptance condition storage device and is used to determine a buyer to be granted a purchase priority of said specific scoop information;

a processor programmed to notify a grant of a purchase priority of said specific scoop information to said terminal of a buyer who made a purchase request satisfying said predetermined trade acceptance condition;

a processor programmed to extract an investigator from an investigator position information storage device, who is in the vicinity of the scoop information locale based on said position information for said specific scoop information, which is stored in said submitted information storage device; and a processor programmed to transmit an investigation request for said specific scoop information to a terminal of the extracted investigator.

16. The scoop information trading system as set forth in claim 15, further comprising means for receiving at least one of article information for said scoop information of said poster or attribute information concerning said scoop information, and storing the received information in said submitted information storage device in association with said scoop information.

17. The scoop information trading system as set forth in claim 15, wherein said predetermined trade acceptance condition includes a condition concerning said buyer.

18. The scoop information trading system as set forth in claim 15, wherein said predetermined trade acceptance condition varies with a lapse of time.

19. The scoop information trading system as set forth in claim 15, wherein said predetermined trade acceptance condition includes a condition whether said scoop information can be used on a plurality of media or not.

20. The scoop information trading system as set forth in claim 15, wherein said predetermined trade acceptance condition includes a condition whether said scoop information can be used by a plurality of buyers or not.

21. The scoop information trading system as set forth in claim 15, further comprising:

a processor programmed to carry out a purchase processing upon receiving a purchase proposal for a specific scoop information from a terminal of said buyer who has said purchase priority for said specific scoop information; and a processor programmed to read out at least said specific scoop information from said submitted information storage device, and transmitting the read information to said terminal of said buyer, after said purchase processing is carried out.

* * * * *